(12) United States Patent
Huang et al.

(10) Patent No.: US 8,432,376 B2
(45) Date of Patent: Apr. 30, 2013

(54) PATTERNED RESISTIVE TOUCH PANEL

(75) Inventors: Kung Chieh Huang, Hsinchu (TW);
Hong Ji Huang, Hsinchu (TW); Seok Lyul Lee, Hsinchu (TW); Ming Chun Li, Hsinchu (TW); Keng-Jui Wu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/570,503

(22) Filed: Aug. 9, 2012

(65) Prior Publication Data

US 2012/0299875 A1    Nov. 29, 2012

Related U.S. Application Data

(62) Division of application No. 12/387,616, filed on May 4, 2009.

(51) Int. Cl.
*G09G 3/30* (2006.01)

(52) U.S. Cl.
USPC .......................................... 345/174; 345/173

(58) Field of Classification Search .................. None
See application file for complete search history.

(56) References Cited

U.S. PATENT DOCUMENTS

| 3,668,313 | A | 6/1972 | Dym |
| 4,929,934 | A | 5/1990 | Ueda et al. |
| 7,136,049 | B2 * | 11/2006 | Muraoka et al. .............. 345/173 |
| 2004/0001048 | A1 | 1/2004 | Kraus et al. |
| 2004/0207606 | A1 | 10/2004 | Atwood et al. |
| 2010/0085315 | A1 | 4/2010 | Hsih |

FOREIGN PATENT DOCUMENTS

| TW | 200735732 | 9/2007 |
| TW | M339051 | 8/2008 |
| TW | M351407 | 2/2009 |
| TW | 200915164 | 4/2009 |
| TW | 200915165 | 4/2009 |

* cited by examiner

*Primary Examiner* — Joseph Haley

(57) ABSTRACT

A touch panel having a first panel and a second panel, wherein the first panel has a voltage providing area connected to a power source and the second panel has a patterned resistive element facing the voltage providing area so that when a touch event on the touch panel occurs, the first panel is caused to make contact with and provide a voltage to the second panel at one or more contact points on the resistive element. By measuring the voltage on one or both ends of the resistive element, it is possible to determine the two-dimensional coordinates of each contact point. The touch panel can have one or more resistive elements located at different touch areas for sensing one or more touch points in a touch event.

20 Claims, 18 Drawing Sheets

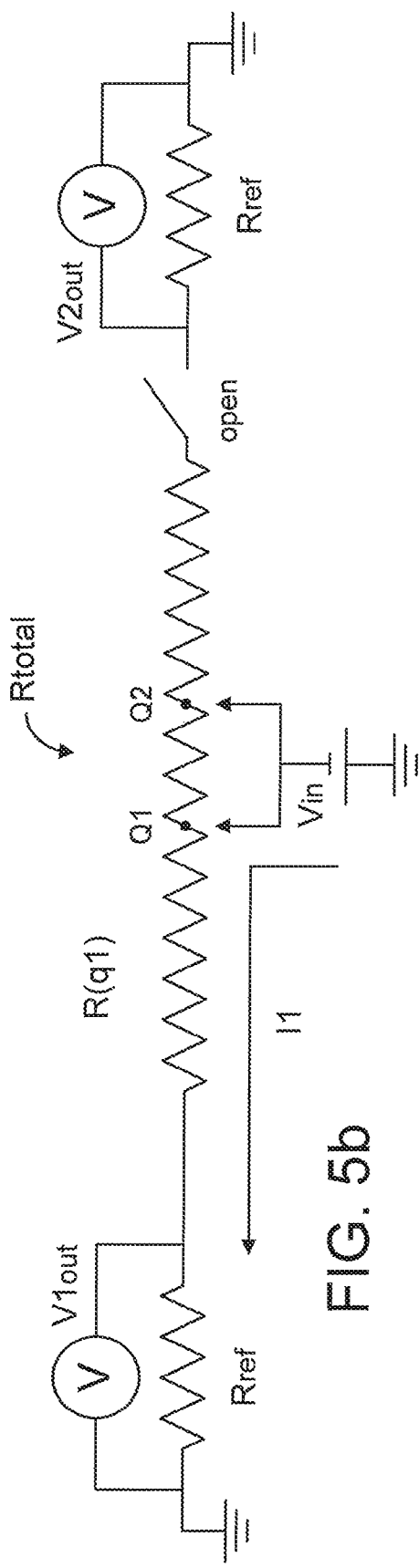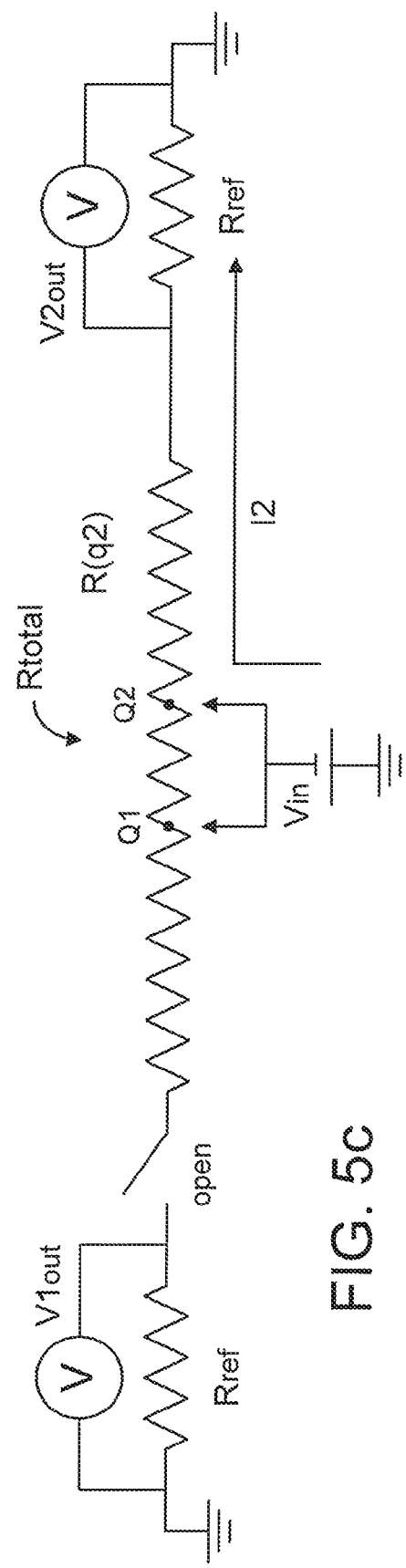

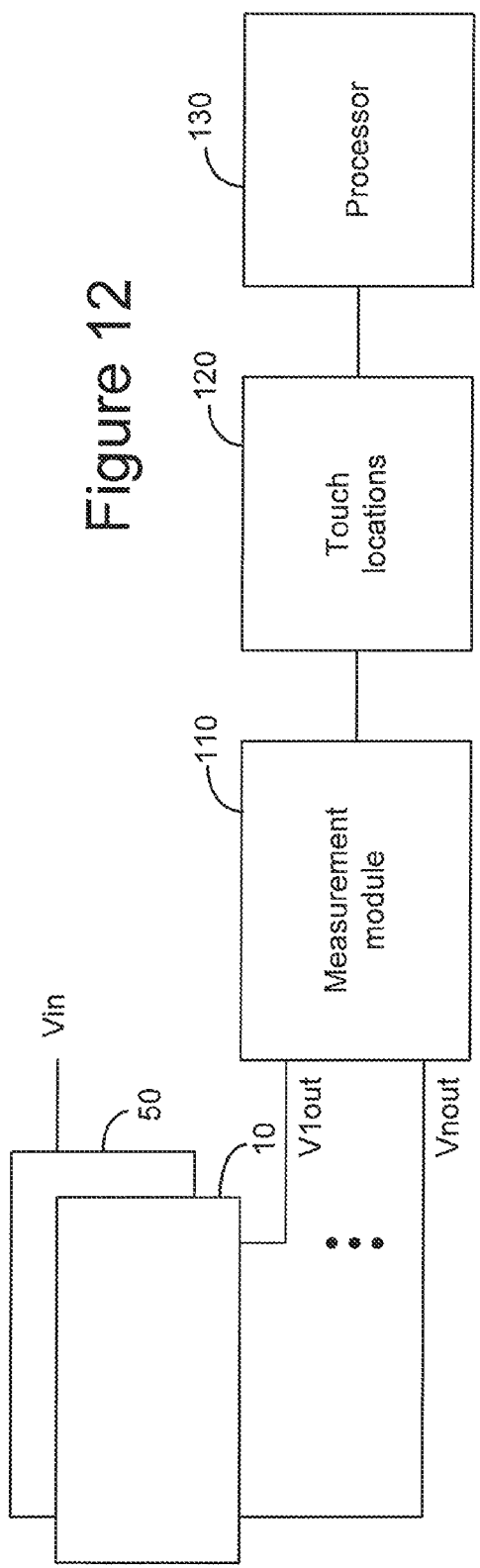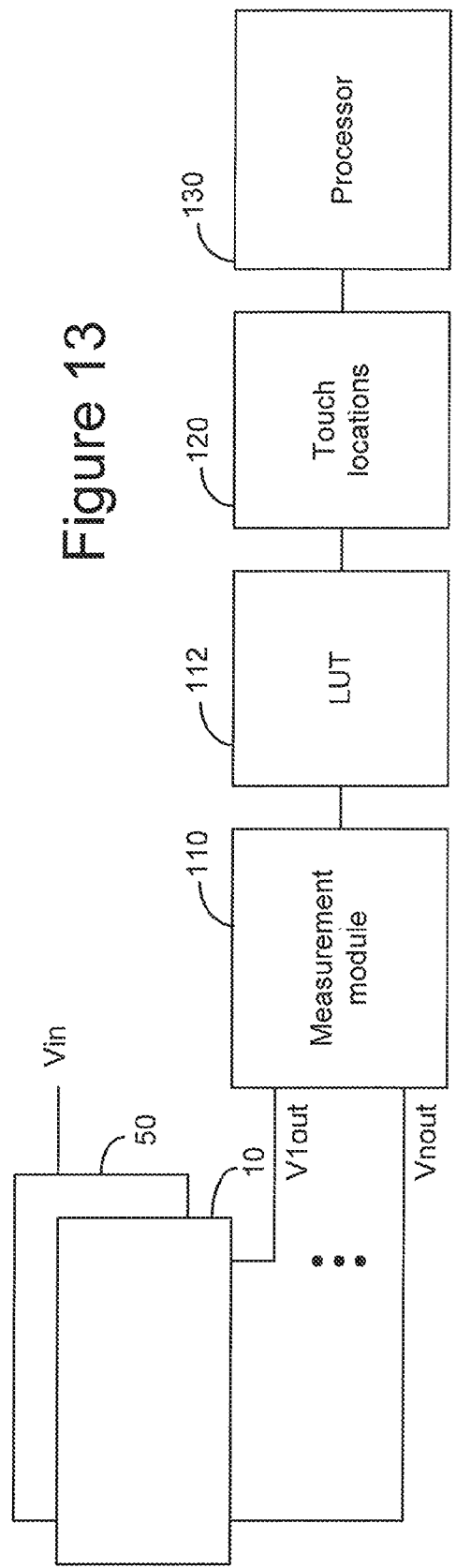

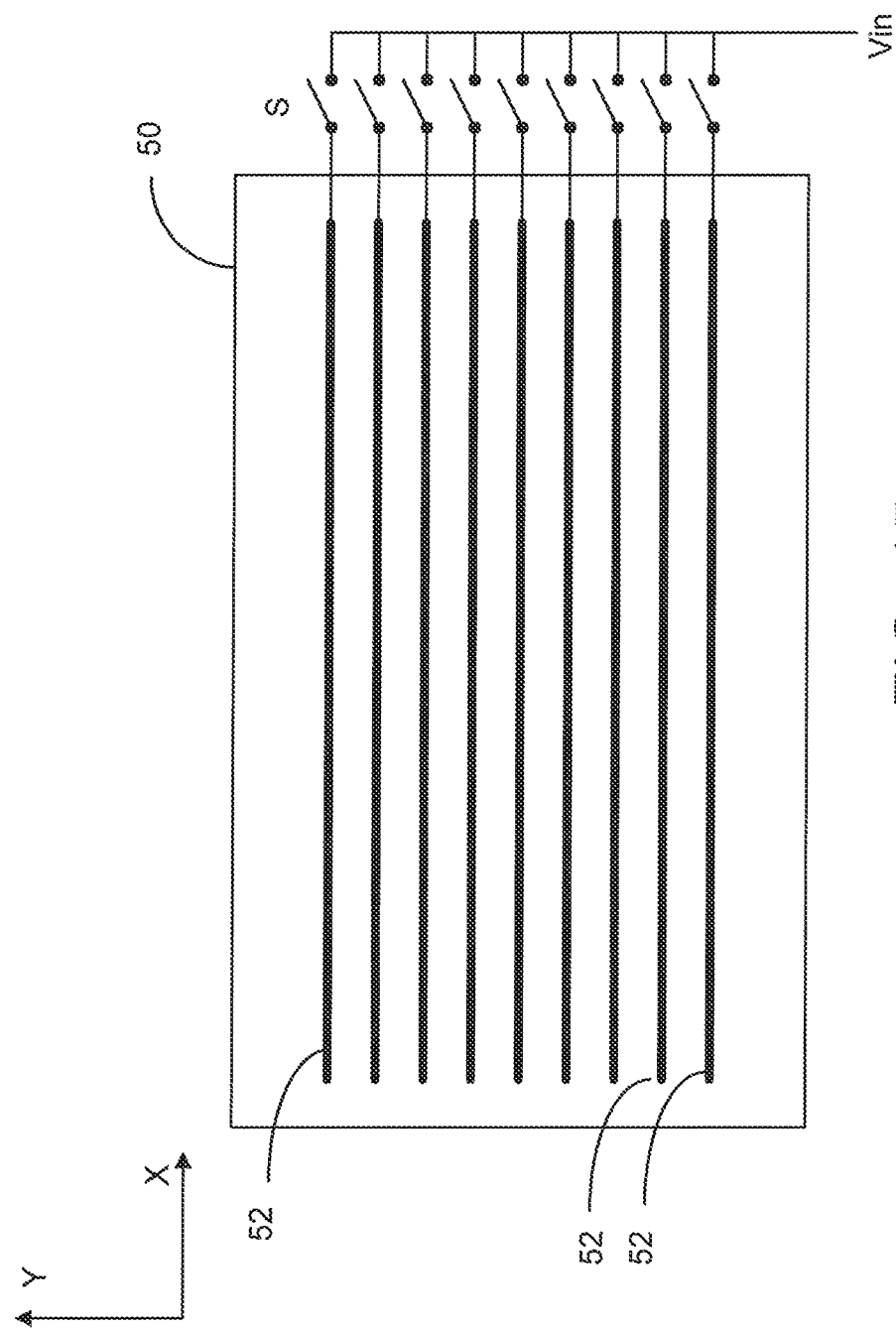

# PATTERNED RESISTIVE TOUCH PANEL

CROSS REFERENCE TO RELATED APPLICATION

This is a divisional application of application Ser. No. 12/387,616 filed May 4, 2009.

FIELD OF THE INVENTION

The present invention relates generally to a touch panel and, more particularly, to a touch panel having at least one patterned resistive element for voltage.

BACKGROUND OF THE INVENTION

A touch panel is commonly used for providing the coordinates of a touch point on the panel. In particular, the coordinates are usually computed from the voltage or current readout when the panel is touched as compared to the voltage or current readout when the panel is not touched. Such a touch panel allows a user to select a menu item, to read a gesture, to write a letter or to draw a symbol, for example. A touch panel can be a stand-alone panel or integrated with a display panel, such as a liquid-crystal display (LCD) panel.

SUMMARY OF THE INVENTION

The present invention is mainly concerned with a touch panel having a first panel and a second panel spaced from the first panel. The first panel has a voltage providing area connected to a power source and the second panel has a patterned resistive element facing the voltage providing area of the first panel so that when a touch event on the touch panel occurs, the first panel is caused to make contact with the second panel at one or more contact points on the resistive element, and the first panel provides an input voltage to the resistive element at each of the contact points. In particular, the patterned resistive element has a meandering shape to cover a touch area. By measuring the voltage on one or both ends of the resistive element, it is possible to determine the two-dimensional coordinates of each contact point. The touch panel can have one or more resistive elements located at different touch areas for sensing one or more touch points in a touch event.

Thus, the first aspect of the present invention is a touch panel as described above. The second aspect of the present invention is a method of touch sensing associated with the touch panel. The method includes the steps of providing a resistive element of a meandering shape in an area on the second panel, the resistive element has a first element end and a second element end; connecting a power source to the first panel, such that when a touch event occurs on the touch panel causing a contact between the first panel and the second panel at a contact point on the resistive element, the first panel is configured to provide a reference voltage to the resistive element at the contact point; measuring a voltage value at the first end of the resistive element; and obtaining two-dimensional coordinates of the contact point at least based on the voltage value.

The third aspect of the present invention is a touch sensing system. The touch sensing system comprises a power source connected to the first panel, such that when the touch event causes the contact at the contact point, the first panel is configured to provide a voltage to the resistive element at the contact point; and a measurement module connected to the second panel for obtaining a measurement value at the first element end, and for determining the two-dimensional coordinates of the contact point based on the measurement value.

The fourth aspect of the present invention is an integrated touch panel device, wherein the touch panel is used with a display panel configured for displaying information. The touch panel is arranged in relationship with the display panel so that the displayed information is visible through the touch panel so as to allow a user to select the displayed information by causing the touch event on the touch panel.

The present invention will become apparent upon reading the description taken in conjunction with FIGS. 2a to 15.

BRIEF DESCRIPTION OF THE DRAWINGS

FIG. 3b shows an equivalent circuit of resistive elements on the touch panel of FIG. 3a.

FIGS. 5b-5d show an equivalent circuit of resistive elements on the touch panel of FIG. 5a in different measurement setups.

FIG. 12 illustrates a touch-panel system, according to one embodiment of the present invention.

FIG. 13 illustrates a touch-panel system, according to another embodiment of the present invention.

FIG. 15 illustrates a different embodiment of the present invention.

DETAILED DESCRIPTION OF THE INVENTION

Figure 1:
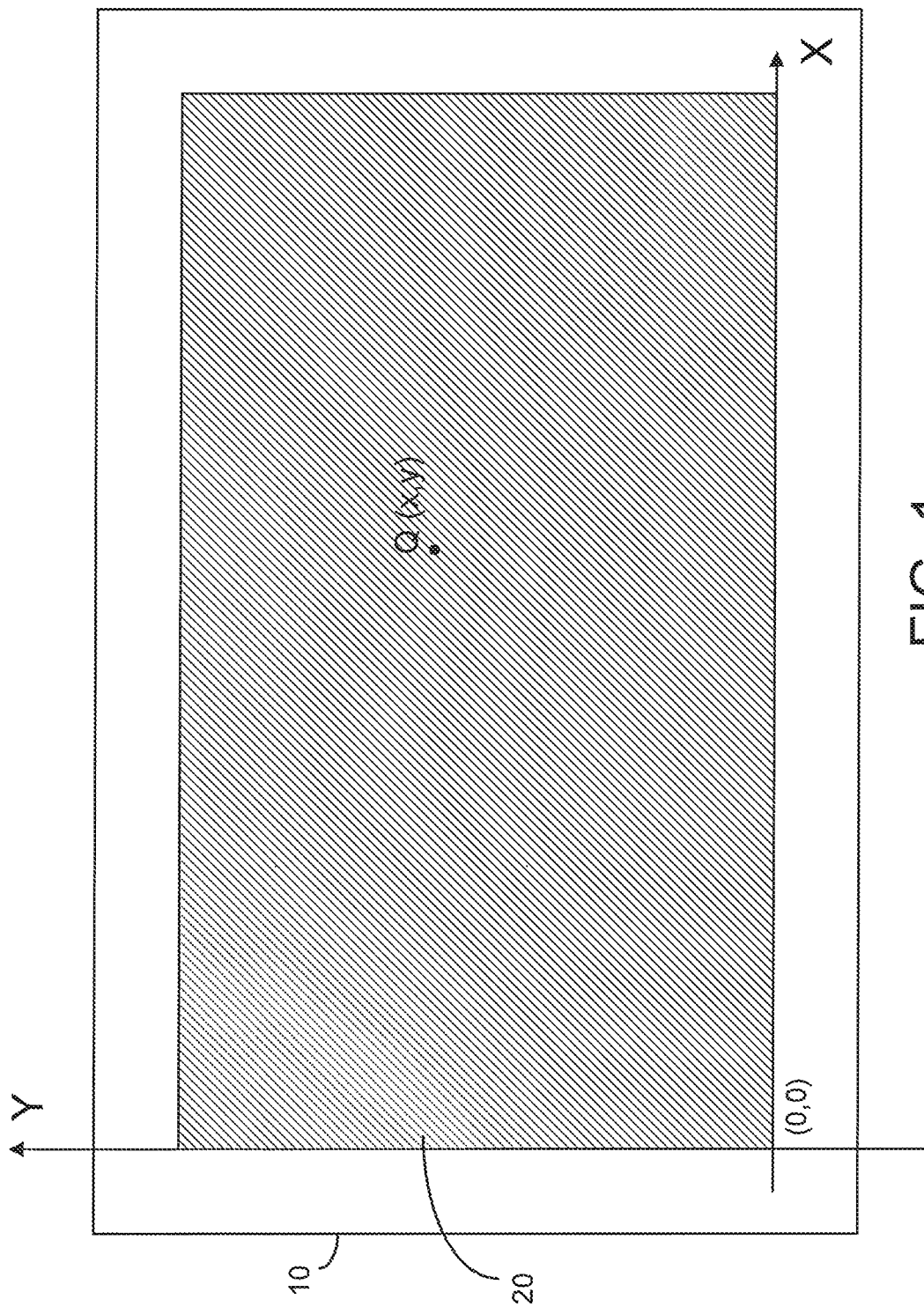
FIG. 1 is a schematic representation of a touch panel.

A touch panel, according to various embodiments of the present invention, comprises two component panels separated by a gap. The component panels are also referred to as substrates. When one of the component panels is touched by a user, for example, the two component panels are brought into electrical contact with each other at least at one point. In most applications, the touch panel is configured to provide the coordinates of the touch point, as shown in FIG. 1. As shown in FIG. 1, the component panel 10 has a touch area 20 with one or more resistive elements for touch sensing. The touch area 20 can be rectangular in shape such that any touch point Q within the touch area 20 can be represented by the coordinates (x, y). It should be noted that one or more of the borders on the component panel 10 outside the touch area 20 may not be necessary and can be eliminated.

Figure 2A:
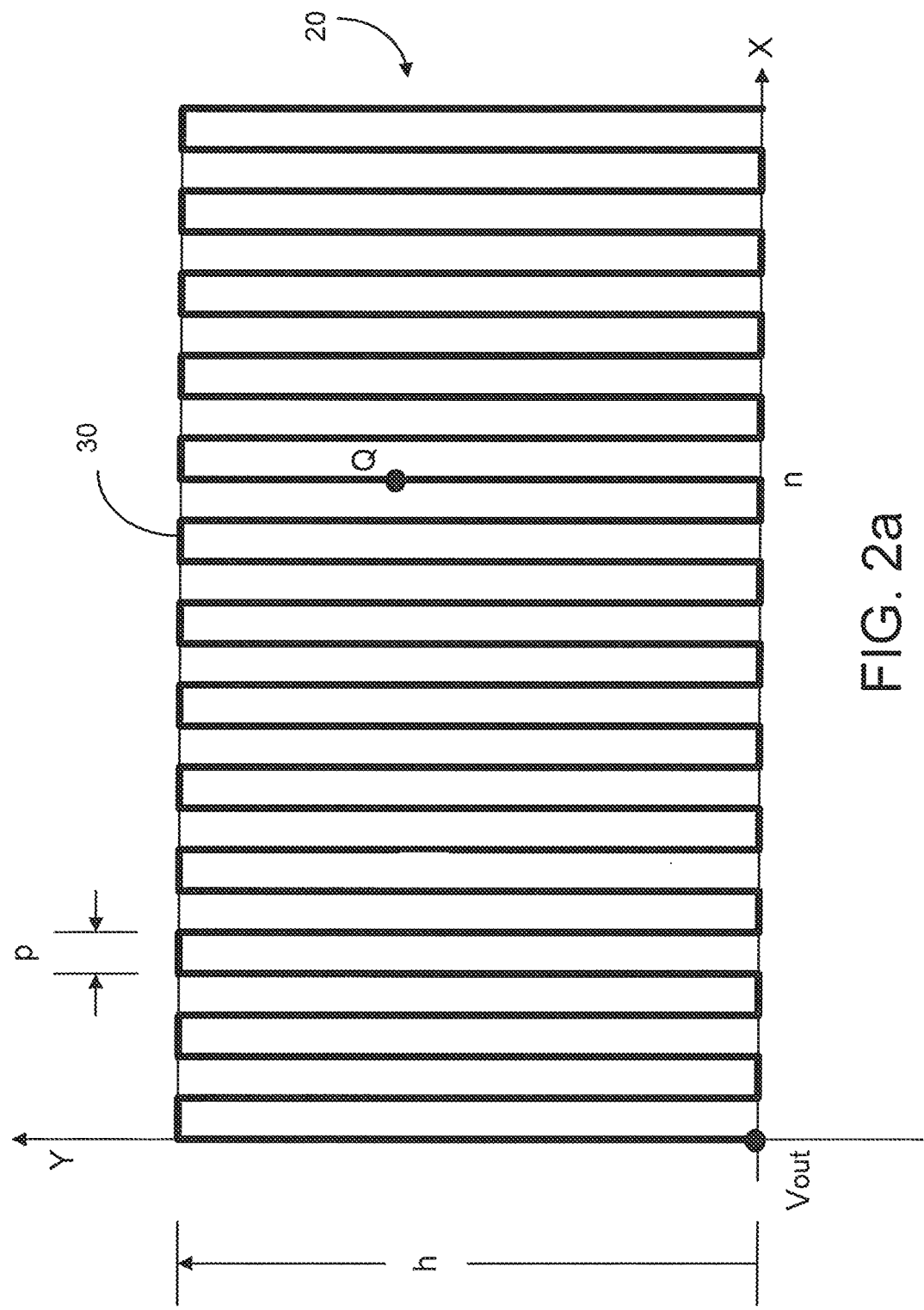
FIG. 2a illustrates one of the component panels, or substrates, in a touch panel, according to one embodiment of the present invention.

According to one embodiment of the present invention, the resistive elements on one of the component panels or substrates comprise a resistive element 30 to cover the entire touch area 20. In this embodiment, the resistive elements 30 comprises a plurality of linear segments parallel to the Y axis and each of the linear segments is electrically connected to the adjacent segment at one segment end so that all the linear segments form a continuous square-wave like pattern with pitch p and height h, as shown in FIG. 2a. The resistive element 30 has a first end and a second end. The first end is placed at (0, 0) coordinates and is connected to a voltage measurement point, Vout. The second end is placed at a different corner of the touch area 20 along the X axis. When a touch event results in a touch point Q, the x-coordinate of the touch point Q is approximately equal to n*p, where n is a positive integer, for example.

Figure 2B:
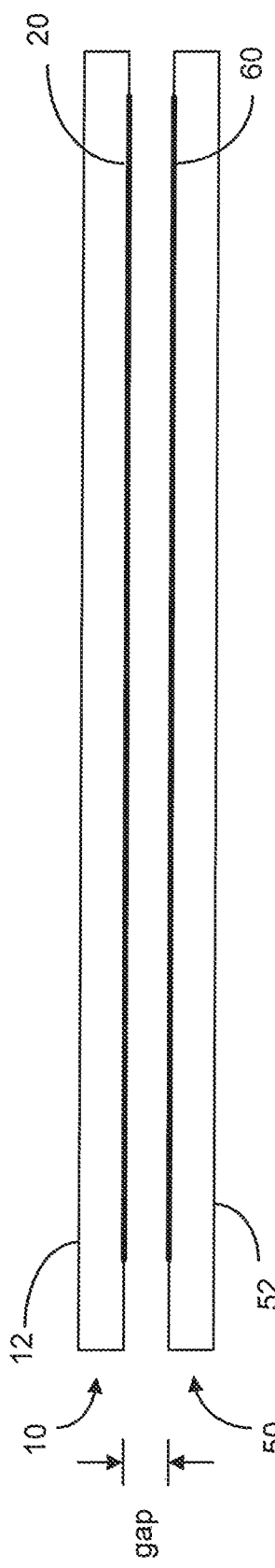
FIG. 2b illustrates both component panels or substrates in a touch panel, according to various embodiments of the present invention.

According to various embodiments of the present invention, as shown in FIG. 2b, the other component panel 50 is placed behind (or in front of) the component panel 10 so that a touch event can occur on the component panel 10 or on the component 50. In a touch event, the gap is closed at the touch point, causing an electrical contact between the component panel 10 and the component 50. At least one of the substrate 12 of the component panel 10 and the substrate 52 of the component panel 50 is made of a flexible material so that more than one touch point can simultaneously occur at different touch locations.

Figure 3B:
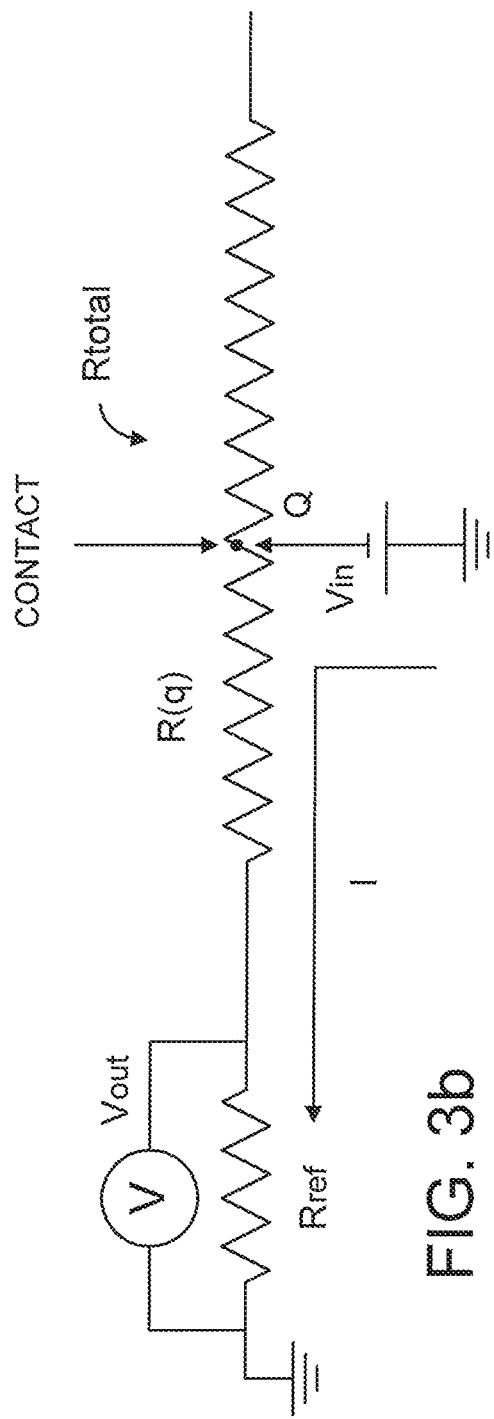
Figure 3A:
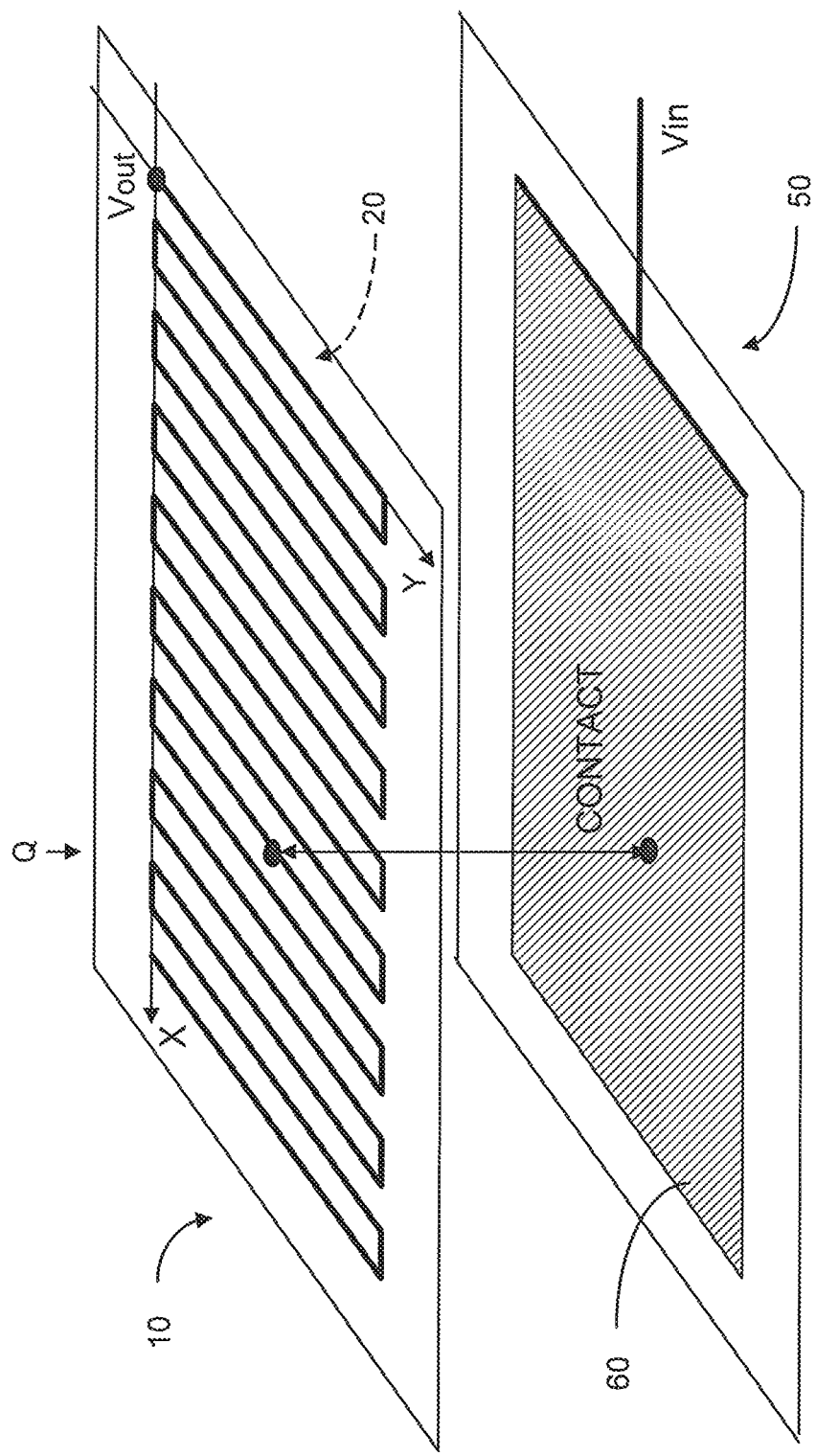
FIG. 3a illustrates the contact between two component panels or substrates in a touch event.

In the embodiment as shown in FIG. 3a, the component panel 50 comprises a layer of electrically conducting material 60, such as indium-tin oxide (ITO) for providing a voltage Vin to the touch point Q on the component panel 10. In this case, the resistance of the ITO layer is negligible as compared to the resistance of the resistive element 30. The equivalent circuit of the touch panel in a touch event is shown in FIG. 3b.

Let L and Rtotal be the total length and the total resistance of the resistive element 30 (see FIG. 3a) and q and R(q) be the length and the resistance of the resistive element 30 from the touch point Q to the first end, then $$q/L = R(q)/Rtotal$$

or $$R(q) = (q/L)*Rtotal$$

In the equivalent circuit as shown in FIG. 3b, Rref is a reference resistance connected between the resistive element 30 and a grounding point. In a touch event causing a contact between the component panel 10 and the component panel 50, the input voltage Vin gives rise to a current I from the touch point Q to the grounding point. As such Rref and R(q) act like a voltage divider to allow a voltage measurement at a measurement point between R(q) and Rref.

From FIG. 3b, it can be seen that voltage Vout at the measurement point is equal to $$Vout/Vin = Rref/(R(q)+Rref)$$

or $$R(q) = Ref*(Vin/Vout-1)$$

and $$q = L(Rref/Rtotal)(Vin/Vout-1)$$

Let $$n \leq q/(h+p) < (n+1),$$

and the (x,y) coordinates of the touch point Q can be computed as follows:

$$x = n*p, \text{ and}$$

$$y = q - n*(h+p)$$

Figure 4:
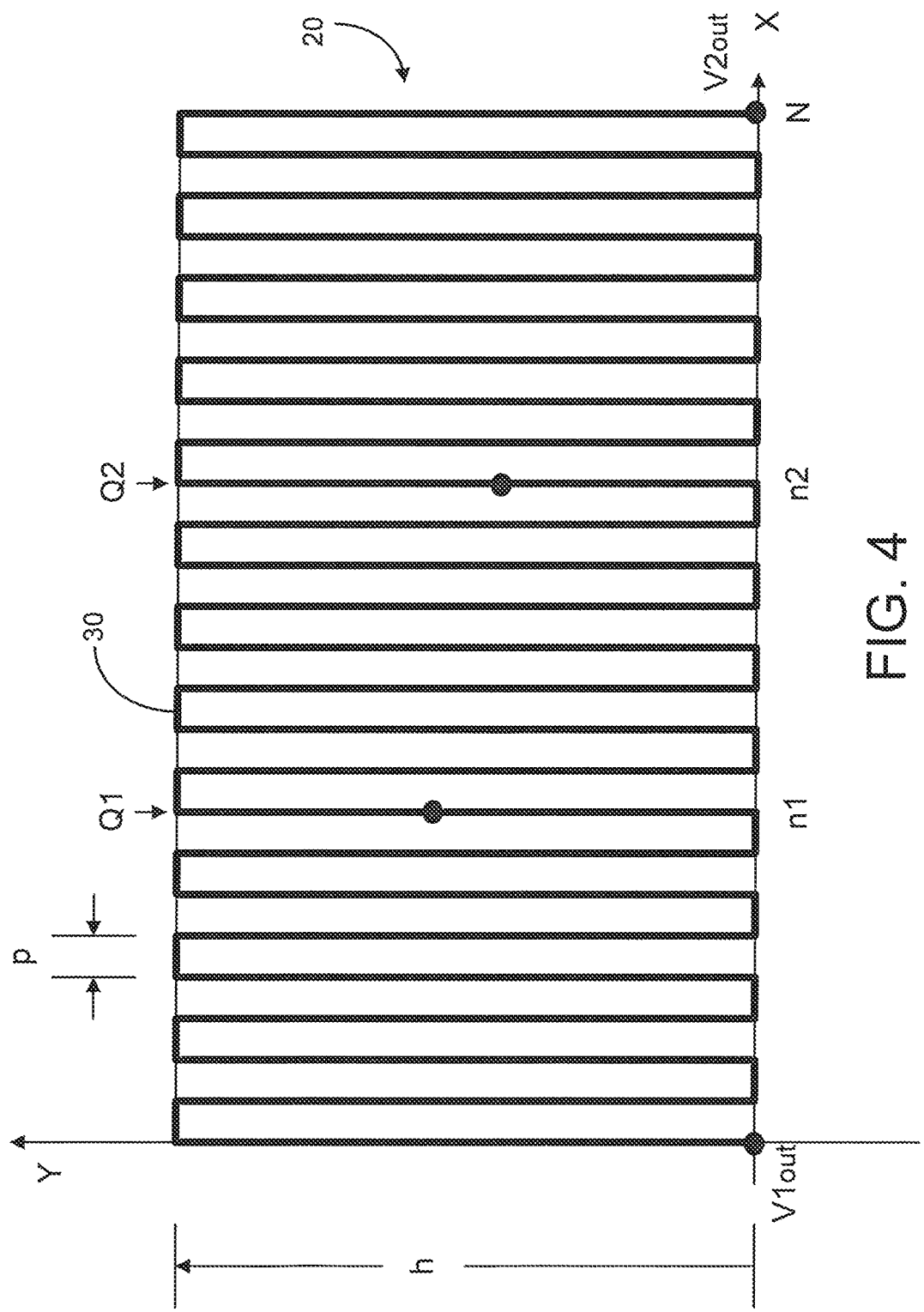
FIG. 4 illustrates one of the two component panels, according to another embodiment of the present invention.
Figure 5A:
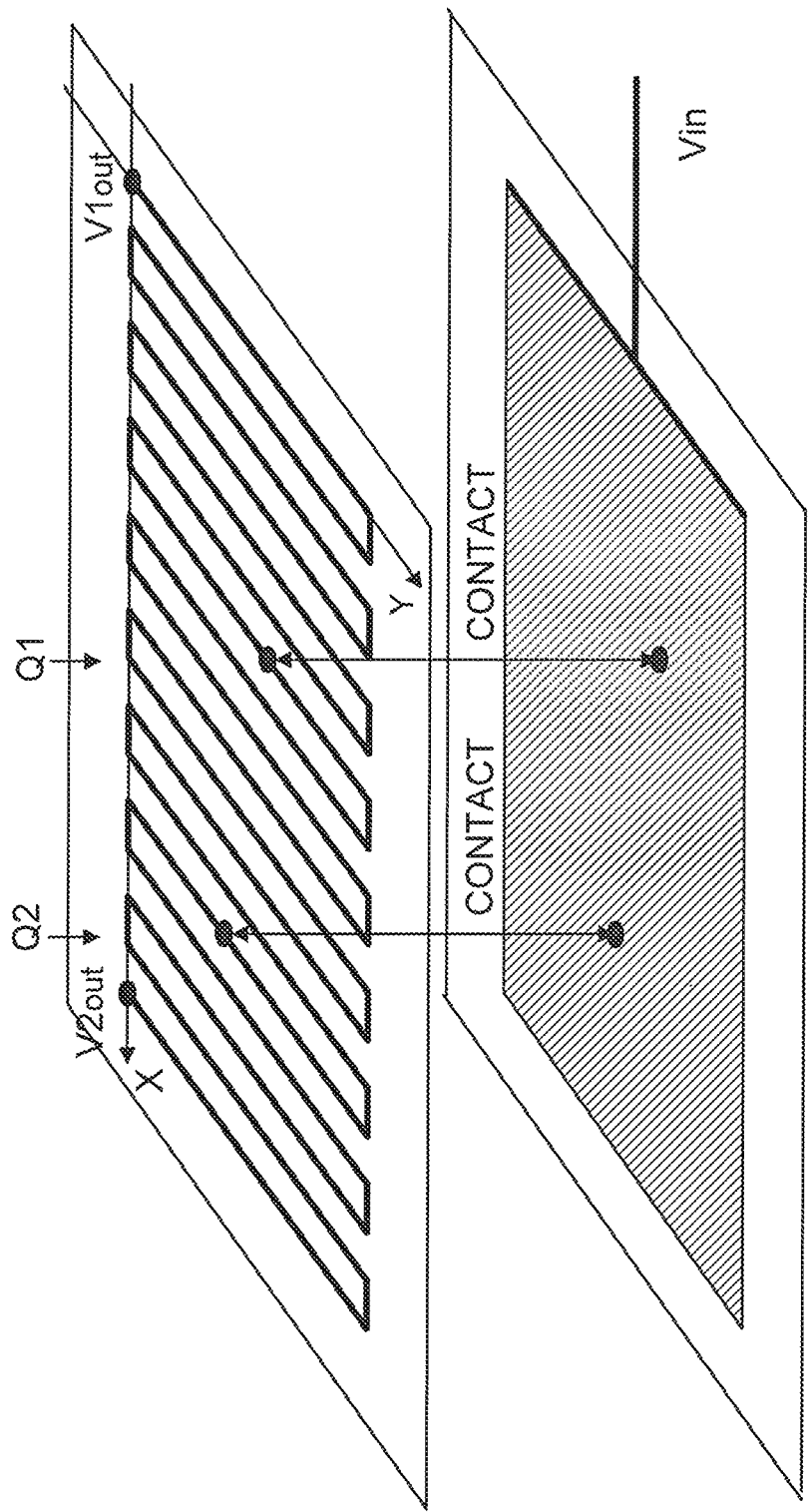
FIG. 5a illustrates the contact between two component panels at two touch points.

It is possible to connect the second end of the resistive element 30 to another voltage measurement point so that the touch panel can be used to determine the coordinates of two touch points Q1, Q2 occurring at the same time. As shown in FIGS. 4 and 5a, the first end of the resistive element 30 is connected to the first voltage measurement point V1out and the second end is connected to the second voltage measurement point V2out. The x-coordinate of the touch point Q1 is approximately equal to n1*p and the x-coordinate of the touch point Q2 is approximately equal to n2*p. The last segment of the resistive element 30 is denoted by the integer N.

Figure 5D:
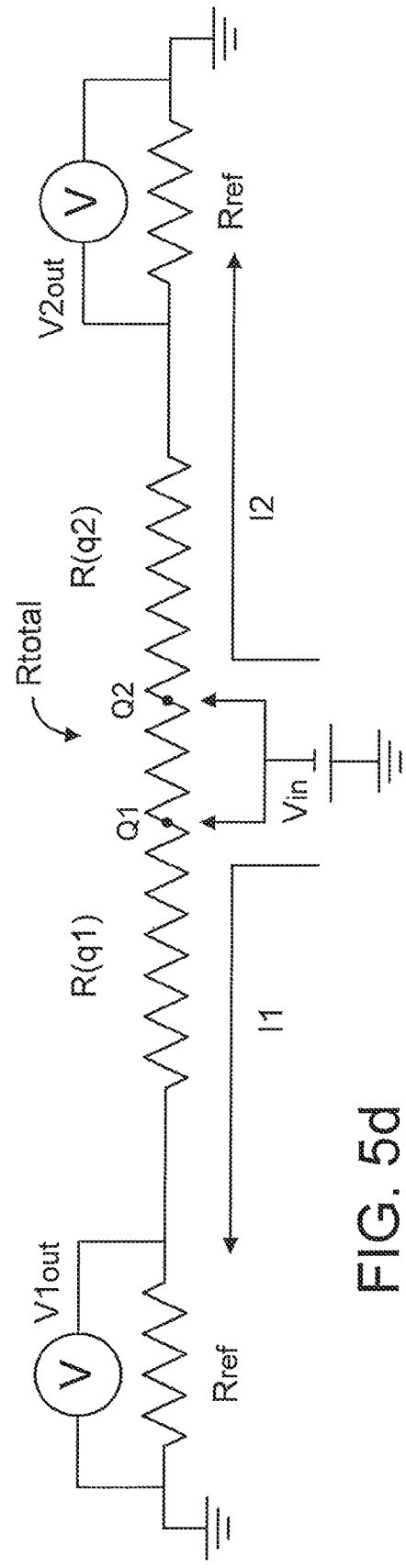

The equivalent circuit of the touch panel in a touch event is shown in FIGS. 5b-5d, depending on how the measurement is made. Since the resistance of the ITO layer is negligible as compared to the resistance of the resistive element 30, the two touch points Q1 and Q2 are, in effect, electrically connected. The coordinates of the touch points Q1 and Q2 can be determined separately or simultaneously.

As shown in FIG. 5b, only the coordinates of the touch point Q1 are determined and the second end of the resistive element 30 can be considered as electrically open. In that case, the measurement is essentially the same as that illustrated in FIG. 3b, and the coordinates (x1, y1) of the touch point Q1 can be determined from:

$$x1 = n1*p$$

$$y1 = q1 - n1*(h+p)$$

where $$q1 = L(Rref/Rtotal)(Vin/V1out-1)$$

and $$n1 \leq q1/(h+p) < (n1-1)$$

with q1 being the length of the resistive element 30 from the touch point Q1 to the first end of the resistive element 30.

As shown in FIG. 5c, only the coordinates (x2, y2) of the touch point Q2 are determined and the first end of the resistive element 30 can be considered as electrically open. The coordinates (x2, y2) of the touch point Q2 can be determined from:

$$x2 = (N-n2)*p, \text{ and}$$

$$y2 = q2 - (N-n2)*(h+p)$$

where $$q2 = L(Rref/Rtotal)(Vin/V2out-1)$$

$$(N-n2) \leq q2/(h+p) < (N-n2+1),$$

with q2 being the length of the resistive element 30 from the touch point Q2 to the second end of the resistive element 30.

FIG. 5d shows the equivalent circuit of the touch panel when the coordinates of both Q1 and Q2 are determined simultaneously.

It should be noted that, in the equivalent circuits as shown in FIGS. 5b and 5c, the determination of the touch point coordinates is carried out as if only one touch point occurs at a time. Thus, with the embodiment as shown in FIG. 4, it is possible to determine the coordinates of a single touch point either from the first voltage measurement point V1out at the first end or from the second voltage measurement point V2out at the second end.

Figure 6:
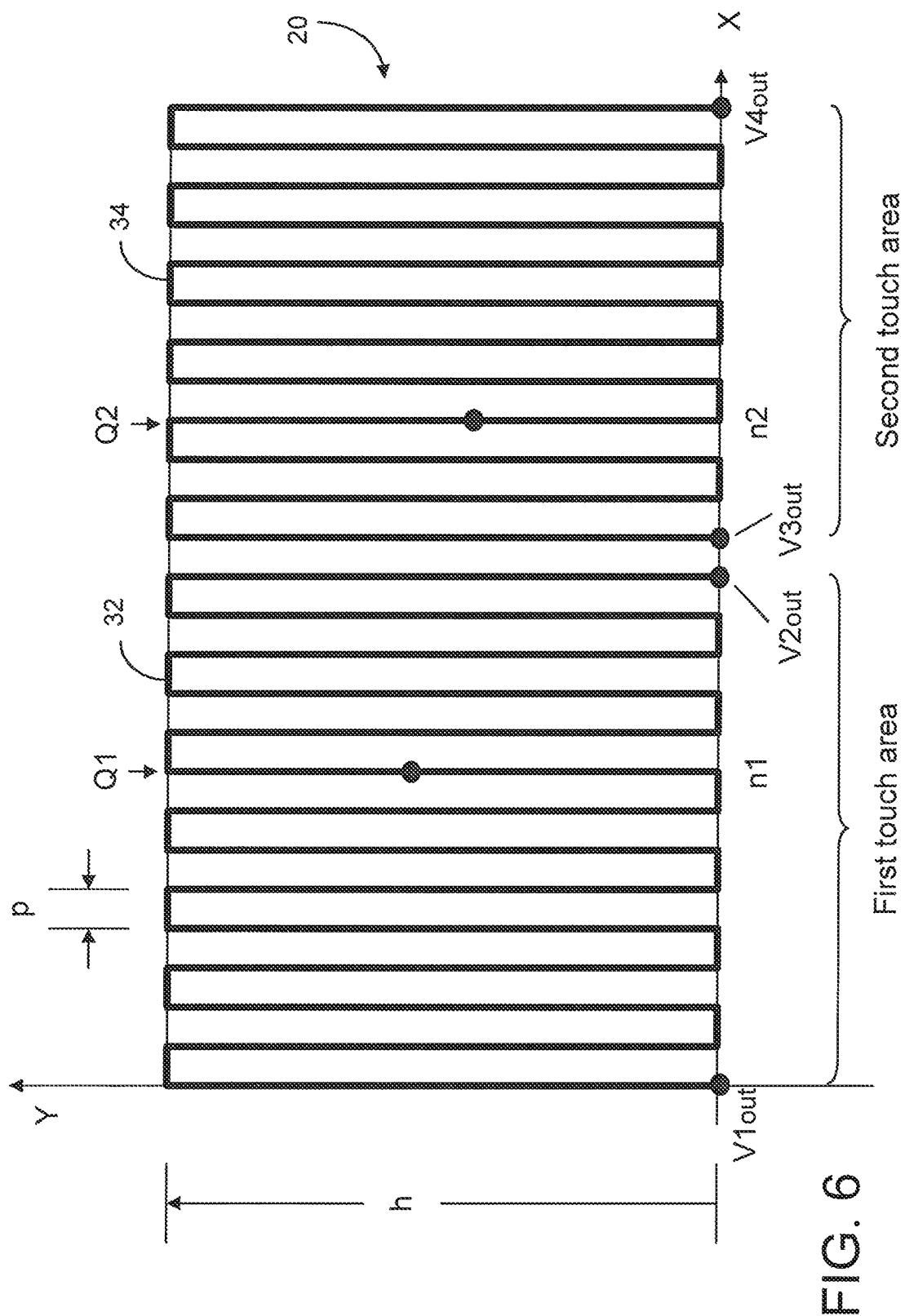
FIG. 6 illustrates one of the component panels of a touch panel, according to a different embodiment of the present invention.

According to another embodiment of the present invention, the touch area 20 can be divided into two or more smaller touch-areas, and each of the smaller area has a separate resistive element. As shown in FIG. 6, the touch area 20 is divided into a first touch area and a second touch area. The first touch area has a resistive element 32 and the second touch area has a different resistive element 34. The two ends of the resistive element 32 are connected to the voltage measurement points V1out and V2out, and the two ends of the resistive element 34 are connected to the voltage measurement points V3out and V4out. With the embodiment as shown in FIG. 6, the touch panel can be viewed as having two electrically separated touch areas.

Figure 7:
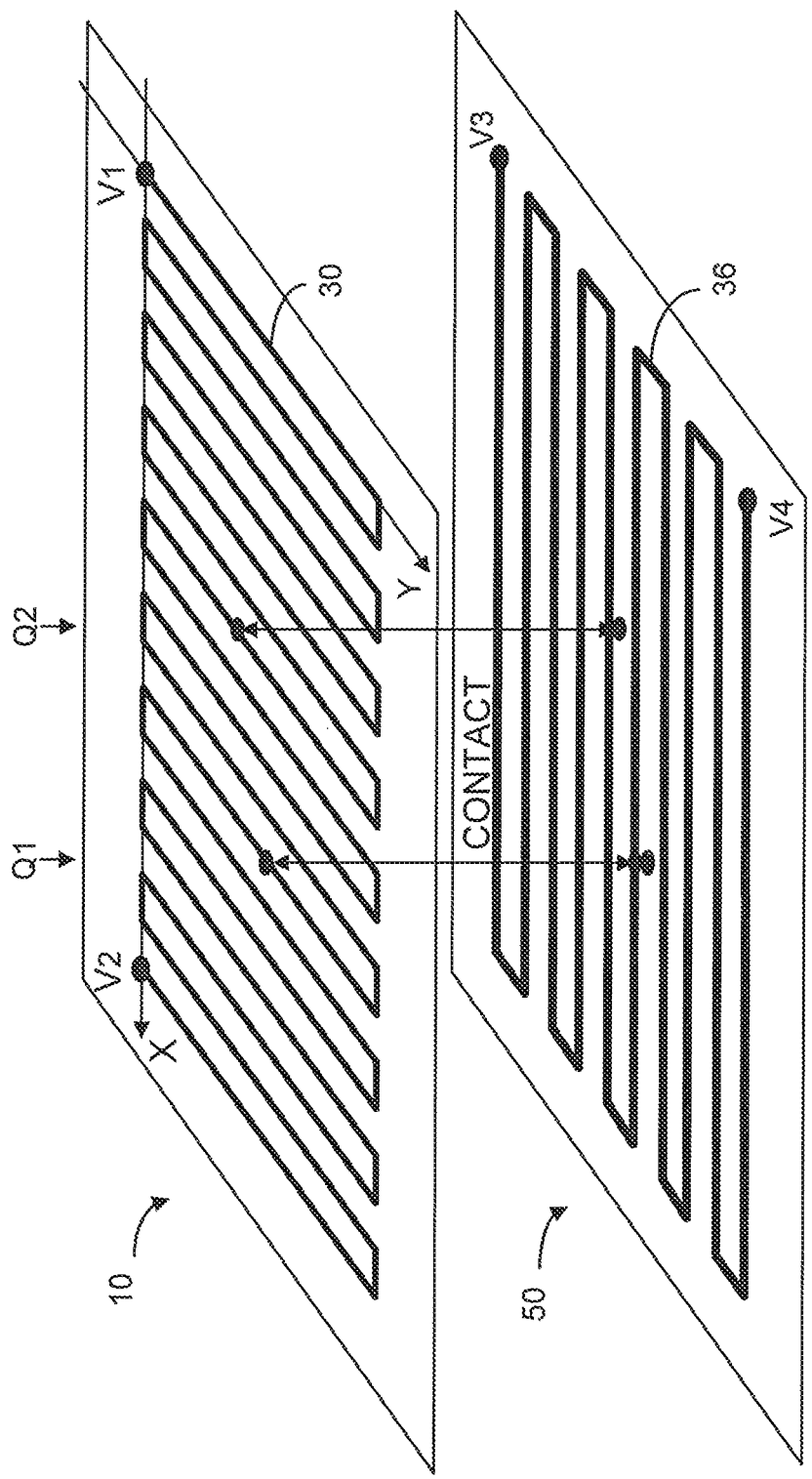
FIG. 7 illustrates yet another embodiment of the present invention.

FIG. 7 illustrates a different component panel 50, according to one embodiment of the present invention. As shown in FIG. 7, each of the component panel 10 and the component panel 50 has a resistive element. The pattern of the resistive element 36 on the component panel 50 is oriented in a different direction from the pattern of the resistive element 30 of the component panel 10. Preferably, the longer linear segments of the resistive element 36 are perpendicular to the longer linear segments of the resistive element 30. The two ends V1, V2 of the resistive element 30 and the two ends V3, V4 of the resistive element 36 can be separately connected to a voltage Vin or used as a readout point.

Figure 8A:
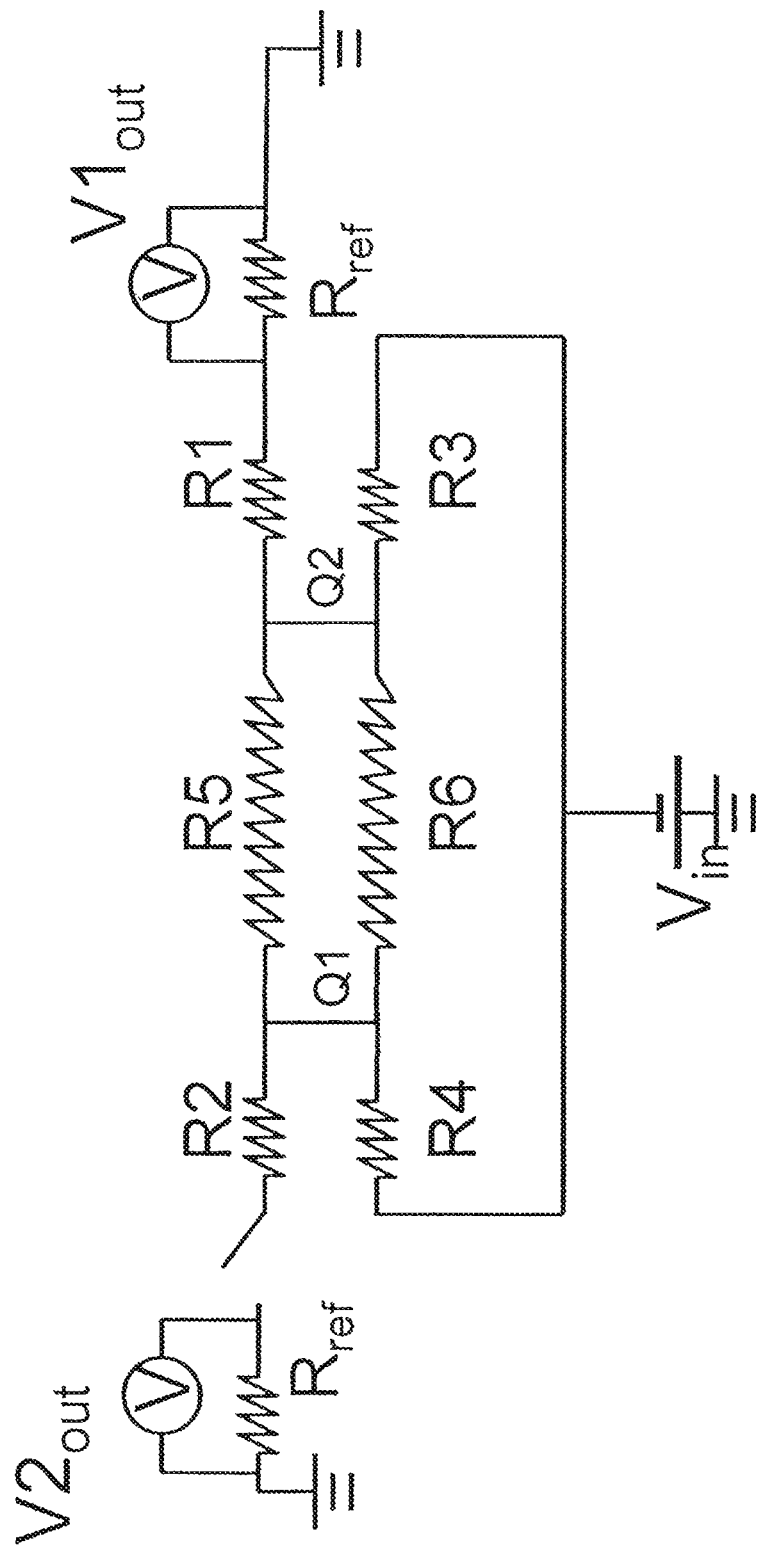
FIGS. 8a-8c illustrates an equivalent circuit of resistive elements on the touch panel of FIG. 7.
Figures 8B, 8C:
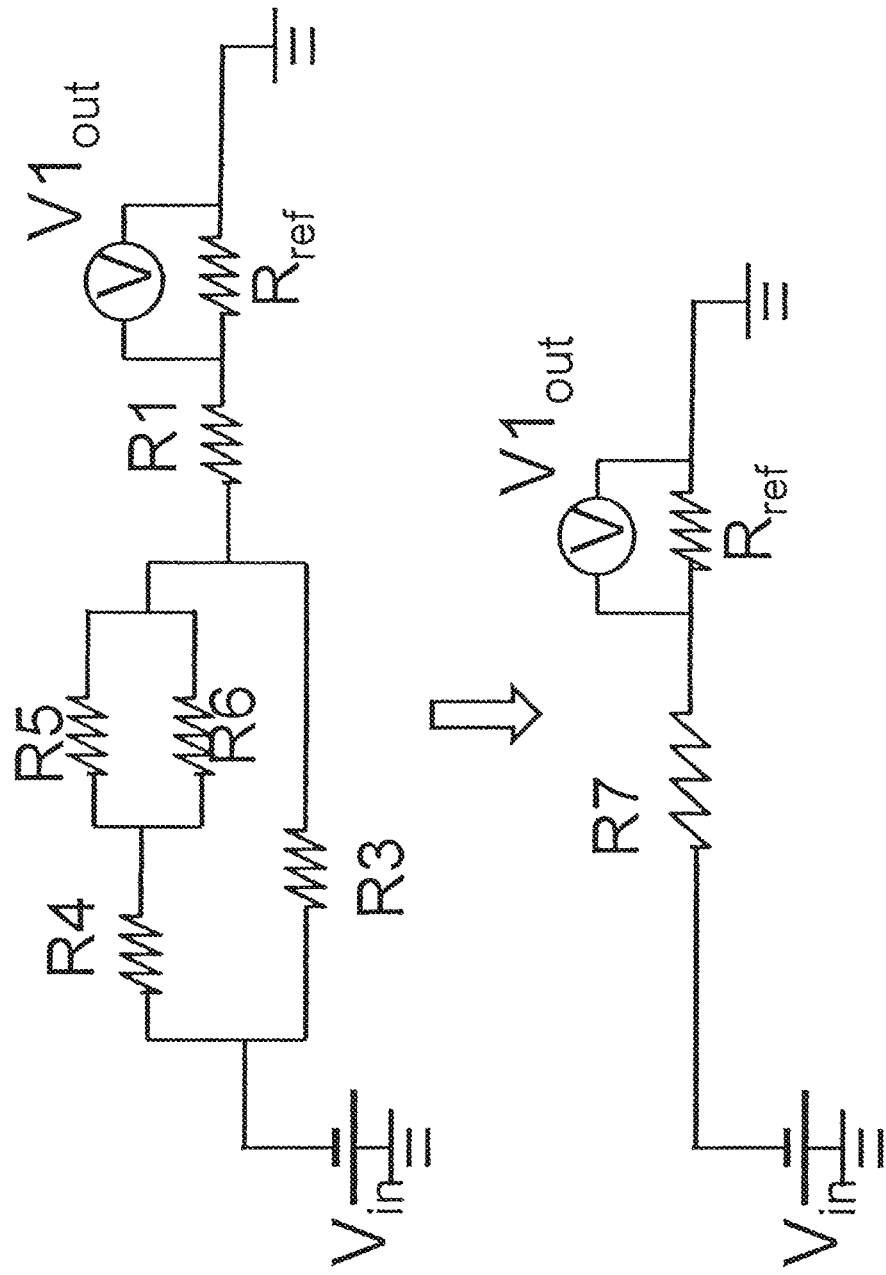

The equivalent circuit of the resistive elements on the component panels 10 and 50 (FIG. 7) having two touch points is shown in FIGS. 8a to 8c. In order to determine the coordinates (x, y) for the two touch points, it is possible to carry out the readout procedure in four steps:

Step 1: Connect V3 and V4 to Vin and read the voltage value at V1;

Step 2: Connect V3 and V4 to Vin and read the voltage value at V2;

Step 3: Connect V1 and V2 to Vin and read the voltage value at V3;

Step 4: Connect V1 and V2 to Vin and read the voltage value at V4.

In Step 1, V2 is left unconnected as shown in FIG. 8a. In FIG. 8a, R2, R5 and R1 are the resistance of different segments in the resistive element 30 (see FIG. 7). R2 is the resistance of the segment between the touch point Q1 to V2; R5 is the resistance of the segment between Q1 and Q2 and R1 is the resistance of the segment between Q2 and V1. R5 is also equal to the resistance of the entire resistive element 30 minus R1 and R2. R4, R6 and R3 are the resistance of different segments in the resistive element 50 (see FIG. 7). R4 is the resistance of the segment between Q1 and V4; R6 is the resistance of the segment between Q1 and Q2 and R3 is the resistance of the segment between Q2 and V3. R6 is also equal to the resistance of the entire resistive element 36 (see FIG. 7). Since the current through R2 is 0, FIG. 8a can be reduced to FIG. 8b.

The resistance of the resistor network consisting of R1, R3, R4, R5 and R6 is equal to R7 as shown in FIG. 8c, and R7 can be expressed as a function of four variables R1, R2, R3 and R4. From FIG. 8c, we obtain $$R7 = Rref * (Vin/V1out) - Rref$$
$$= F1(R1, R2, R3, R4),$$

or $$Rref * (Vin/V1out - 1) = F1(R1, R2, R3, R4).$$

Likewise, in Step 2 to Step 4, we also obtain:

$$Rref*(Vin/V2out-1)=F2(R1,R2,R3,R4)$$

$$Rref*(Vin/V3out-1)=F3(R1,R2,R3,R4)$$

$$Rref*(Vin/V4out-1)=F4(R1,R2,R3,R4).$$

In the above four equations, Vin and Rref are given and V1out to V4out can be measured. It is possible to determine R1, R2, R3 and R4 with the given values and the measurement values. Accordingly, the coordinates for the two touch points Q1 and Q2 can be determined from your equations with four variables.

Figure 9:
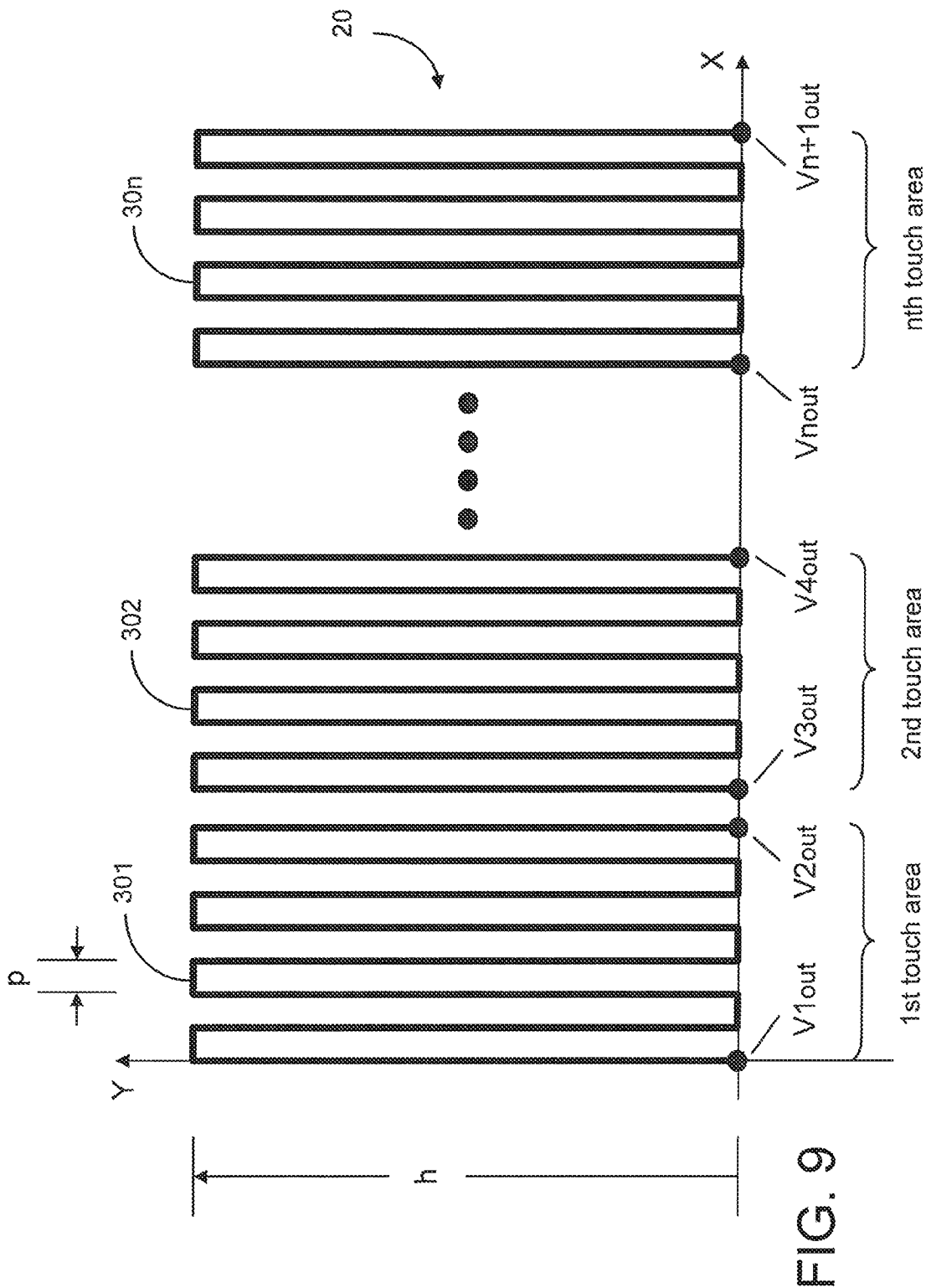
FIG. 9 illustrates one of the two component panels for multi-touch applications, according to one embodiment of the present invention.

As can be seen from FIG. 2a, it is possible to determine the coordinates of a single touch point with one resistive element when only one end of the resistive element is connected to a measurement point. As can be seen from FIG. 4, FIG. 5a and FIG. 7, it is possible to simultaneously determine the coordinates of two touch points in a touch area with one resistive element when both ends of the resistive element are connected to separate measurement points. In FIG. 6, the two resistive elements 32 and 34 can be viewed as covering two touch areas, with each of the touch areas being used to detect one touch point. However, because both ends of the resistive element 32 and both ends of the resistive element 34 are connected to separate measurement points (V1out, V2out, V3out and V4out), it is possible to simultaneously detect four touch points, with two touch points being located in one touch area. Likewise, a component panel with n resistive elements can be viewed as having n touch areas, as shown in FIG. 9. With each touch area being capable of detecting two touch points, it is possible to simultaneously detect 2n touch points in n touch areas.

Figure 10:
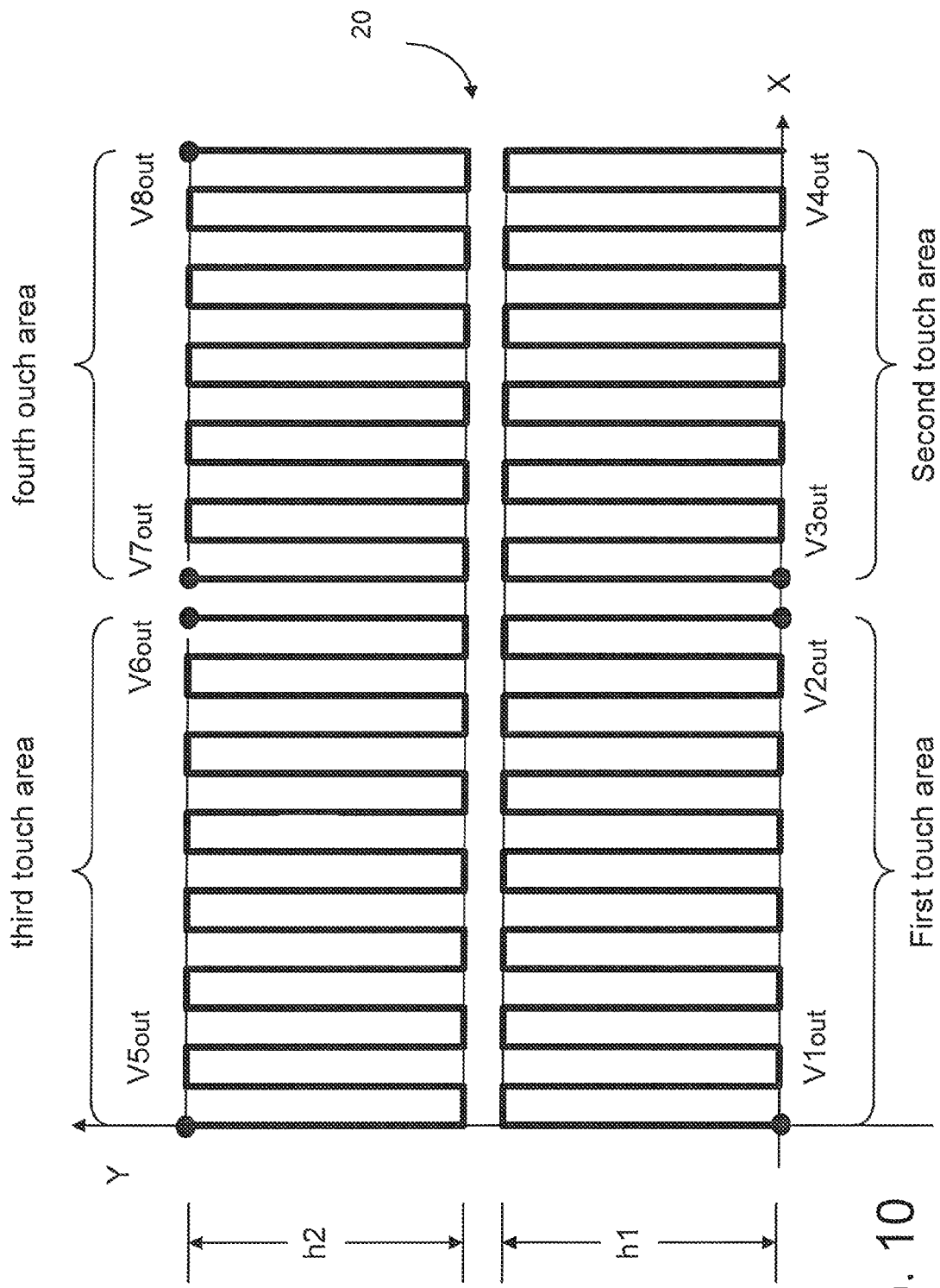
FIG. 10 illustrates one of the two component panels for multi-touch applications, according to another embodiment of the present invention.
Figure 11B:
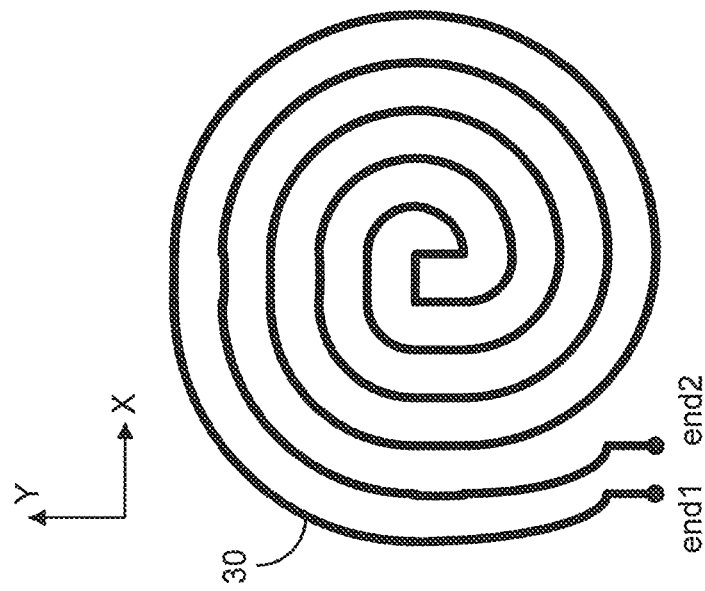
FIG. 11b illustrates another arrangement of a single resistive element, according to the present invention.
Figure 11A:
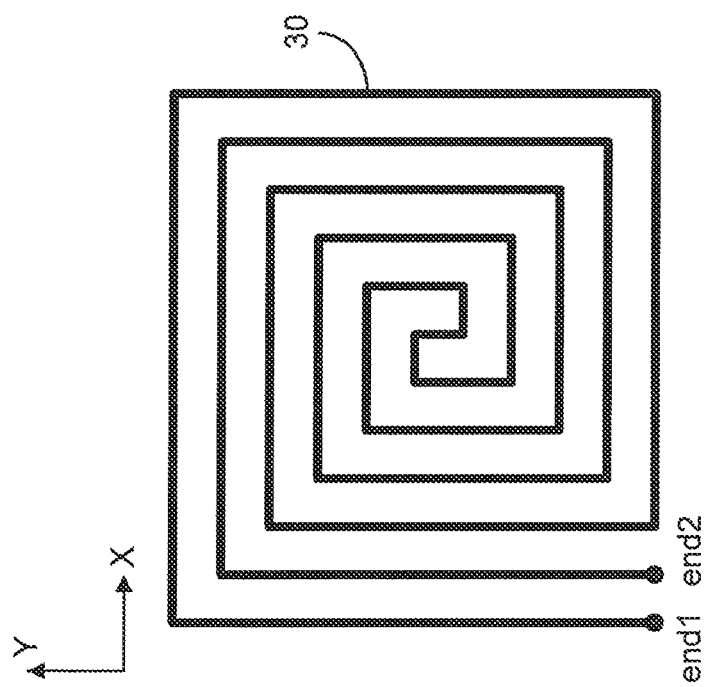
FIG. 11a illustrates a different arrangement of a single resistive element, according to one embodiment of the present invention.

According to one embodiment of the present invention, the touch areas are arranged along one axis, as shown in FIG. 9. According to another embodiment of the present invention, the touch areas are arranged in both axes, as shown in FIG. 10. Furthermore, the resistive element in each touch area can be arranged in a square-wave pattern, as shown in FIG. 2a. It is also possible to arrange the resistive element in each touch area in a different pattern or shape, as shown in FIGS. 11a and 11b.

FIG. 12 shows a touch panel system of the present invention. As shown in FIG. 12, the touch system comprises one or more voltage sources for providing Vin to the component panel 50, a measurement module 110 connected to the ends of resistive elements on the component panel 10 so as to determine the coordinates of each touch point. The coordinates of each touch point are stored in the touch location module 120. The touch locations are provided to a processor 130 for carrying out the functions associated to the touch events.

FIG. 13 shows a touch panel system, according to another embodiment of the present invention. In addition to the blocks 110, 120 and 130 as shown in FIG. 12, this touch panel system may have a look-up table 112. The look-up table 112 can be used to pre-store the coordinates of each touch point in the manufacturing process. For example, when a user touches the touch area 20 as shown in FIG. 2a, causing a voltage output at the measurement point Vout, the coordinates of the touch point Q can be obtained from the look-up table without the need of computation. The look-up table is particularly useful when the resistive element is arranged in a pattern as shown in FIGS. 11a and 11b and the touch panel as shown in FIG. 7.

Figure 14A:
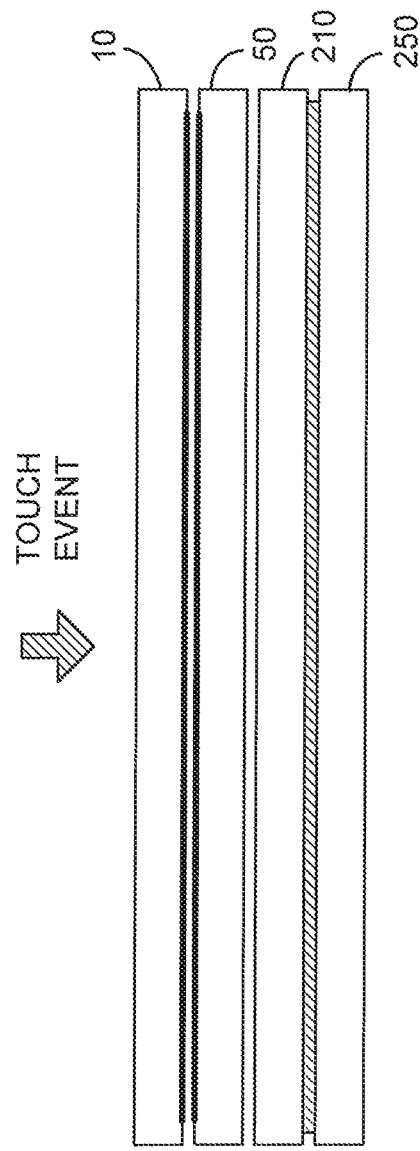
FIG. 14a illustrates an integrated display system having a touch panel, according to one embodiment of the present invention.
Figure 14B:
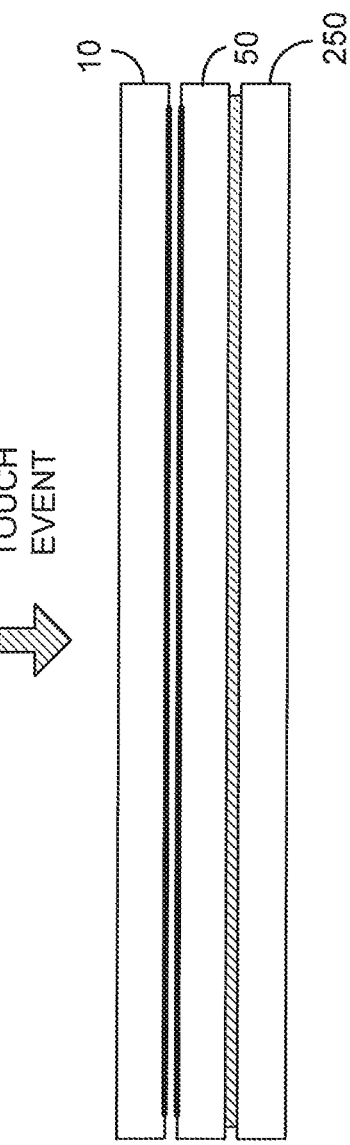
FIG. 14b illustrates an integrated display system having a touch panel, according to another embodiment of the present invention.

The touch panel, according to various embodiments of the present invention, can be used as a stand-alone device, or be used together with a display panel as shown in FIGS. 14a and 14b.

In the embodiment as shown in FIG. 14a, the touch panel is placed on top of a display panel. The display panel comprises a first substrate 210, and a second substrate 250. The display panel has one or more layers between the first and second substrates for imaging forming or light emitting so as to provide displayed information visible through the first substrate 210, for example. The component panel 50 of the touch panel can be directly placed on top of the first substrate 210 so as to allow a user to select the displayed information by touching the component 10. It is also possible to place the component panel 10 of the touch panel on top of the first substrate 210 so as to allow a user to select the displayed information by touching the component 50.

In the embodiment as shown in FIG. 14b, the touch panel is integrated with the display panel such that the component panel 50 is also used as the first substrate of the display panel.

In yet a different embodiment of the present invention, the component panel 50 comprises a plurality of electrically conductive linear segments 52, each linear segment connected to Vin through a switch S. This component panel 50 can be used with the component panel 10 as shown in FIGS. 3a and 5a, for example. In a touch event, the switches S are closed one at a time in order to determine which of the linear segments 52 provides a voltage readout at V1out and/or V2out. As such, the y coordinate (for FIG. 3a) and the y1, y2 coordinates (for FIG. 5a) can be determined.

It should be noted that, each of the resistive elements in the touch area 20 as shown in 2a, 3a, 4, 6, 9 and 10 can be made of a resistive wire. The resistive element can also be made from a patterned electrically conductive layer such as indium-tin oxide (ITO). Likewise, the resistive element 36 as shown in FIG. 7 can be made of a resistive wire or a patterned ITO layer.

In summary, the present invention provides a touch panel and a method for touch sensing using the touch panel. The touch panel has a first component panel, and a second component panel spaced from the first component panel leaving a gap between the first component panel and the second component panel, wherein the second component panel comprises a resistive element arranged in a meandering shape in an area, such that when a touch event occurs on the touch panel causing a contact between the first component panel and the second component panel at a contact point on the resistive element, the contact point is identifiable by two-dimensional coordinates of a location in the area.

The resistive element has a total length defined by a first element end and a second element end, the first element end configured for electrical measurement, wherein the first component panel is configured for connection to a power source, such that when the touch event causes the contact at the contact point on the resistive element, the first component panel is configured to provide a voltage to the resistive element at the contact point, and the electrical measurement at the first end is configured to yield a measurement value at least depending on the voltage and the two-dimensional coordinates.

In one embodiment of the present invention, the first element end is connected to a reference resistance element for voltage measurement, wherein the measurement value comprises a voltage value at least depending on the voltage, the two-dimensional coordinates of the contact point and resistance of the reference resistance element.

In another embodiment of the present invention, the second element end is also configured for electrical measurement, such that when the touch event causes the contact between the first component panel and the second component panel additionally at a different contact point on the resistive element, the different contact point is identifiable by different two-dimensional coordinates of the area, and the electrical measurement at the second end is configured to yield a different measurement value.

In various embodiments of the present invention, the two-dimensional coordinates comprise coordinate value of a first axis and coordinate value of a second axis, and the resistive element comprises a plurality of first segments along the first axis and one or more second segments along the second axis, connected together to form the meandering shape. The first axis can be perpendicular to the second axis for providing the Cartesian coordinates of a touch location, for example.

The touch panel can have one, two or more touch areas, with each touch area having a separate resistive element. For example, the touch panel can have a second resistive element arranged in a different area, such that when the contact between the first component panel and the second component panel additionally occurs at a further contact point at the second resistive element, the further contact point is identifiable by two-dimensional coordinates of a location in the different area. Each end of the resistive elements is connected to a measurement point for electrical measurement.

The first component panel can have an electrically conductor layer covering an entire area or a patterned resistive element having a meandering shape covering the area.

The method of touch sensing, according to various embodiments of the present invention, comprises the steps of providing a resistive element of a meandering shape in an area on the second component panel, the resistive element has a first element end and a second element end; connecting a power source to the first component panel, such that when a touch event occurs on the touch panel causing a contact between the first component panel and the second component panel at a contact point on the resistive element, the first component panel is configured to provide a reference voltage to the resistive element at the contact point; measuring a voltage value at the first end of the resistive element; and obtaining two-dimensional coordinates of the contact point at least based on the voltage value.

In a different embodiment of the present invention, the resistive element has a resistance value between the contact point and the first element end, said resistance value indicative of the two-dimensional coordinates of the contact point, and the method further comprises the steps of connecting a reference resistance element to the first element end for said measuring, the reference resistance element having a reference resistance value; and computing the resistance value based on the reference resistance value, the reference voltage and the voltage value at the first end, so as to determine the two-dimensional coordinates of the contact point.

In yet a different embodiment of the present invention, the two-dimensional coordinates of the contact point are obtained a look-up table based on the voltage value.

The touch panel, according to various embodiments of the present invention, can be used in a touch sensing system. The touch sensing system comprises a power source connected to the first component panel, such that when the touch event causes the contact at the contact point, the first component panel is configured to provide a voltage to the resistive element at the contact point; and a measurement module connected to the second component panel for obtaining a measurement value at the first element end, and for determining the two-dimensional coordinates of the contact point based on the measurement value.

In a different embodiment of the present invention, the touch sensing system may have a look-up table so that the two-dimensional coordinates of the contact point can be determined from the look-up table based on the measurement value.

The touch panel, according to various embodiments of the present invention, can be used with a display panel configured for displaying information. The touch panel is arranged in relationship with the display panel so that the displayed information is visible through the touch panel so as to allow a user to select the displayed information by causing the touch event on the touch panel.

Each of the resistive elements on the touch panel of the present invention, can be made of resistive wire or a transparent material such as indium tin oxide and cadmium sulfide or the like.

In the description above, a component panel can also be referred to as a substrate.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A touch panel comprising:
a first substrate, and
a second substrate spaced from the first substrate leaving a gap between the first substrate and the second substrate, wherein the second substrate comprises a resistive element arranged in a meandering shape in an area, such that when a touch event occurs on the touch panel causing a contact between the first substrate and the second substrate at a first contact point on the resistive element, the first contact point is identifiable by two-dimensional coordinates of a location in the area, wherein the resistive element comprises a first element end and a second element end, the first element end configured for electrical measurement, and wherein the first substrate is configured for connection to a power source, such that when the touch event causes the contact at the first contact point on the resistive element, the first substrate is configured to provide a voltage to the resistive element at the first contact point, and the electrical measurement at the first element end is configured to yield a first measurement value at least depending on the voltage and the two-dimensional coordinates, and wherein the second element end is also configured for electrical measurement, such that when the touch event also causes the contact between the first substrate and the second substrate additionally at a second contact point on the resistive element, the second contact point is identifiable by different two-dimensional coordinates of the area, and the electrical measurement at the second element end is configured to yield a second measurement value.

2. The touch panel according to claim 1, wherein the first element end is connected to a reference resistance element for voltage measurement, and wherein the first measurement value comprises a voltage value at least depending on the voltage, the two-dimensional coordinates of the first contact point and resistance of the reference resistance element.

3. The touch panel according to claim 1, wherein the two-dimensional coordinates comprise coordinate value of a first axis and coordinate value of a second axis, and wherein the resistive element comprises a plurality of first segments along the first axis and one or more second segments along the second axis, connected together to form the meandering shape.

4. The touch panel according to claim 1, wherein the first measurement value is indicative of a length of the resistive element from the first contact point to the first element end and a total length of the resistive element.

5. A method for touch sensing on a touch panel comprising a first substrate and a second substrate spaced from the first substrate leaving a gap therebetween, said method comprising:
providing a resistive element of a meandering shape in an area on the second substrate, the resistive element has a first element end and a second element end;
connecting a power source to the first substrate, such that when a touch event occurs on the touch panel causing a contact between the first substrate and the second substrate at a first contact point and a second contact point on the resistive element, the first substrate is configured to provide a reference voltage to the resistive element at the first contact point and the second contact point;
measuring a first voltage value at the first element end of the resistive element;
obtaining two-dimensional coordinates of the first contact point at least based on the first voltage value;
measuring a second voltage value at the second element end of the resistive element; and
obtaining two-dimensional coordinates of the second contact point at least based on the second voltage value.

6. The method according to claim 5, wherein the resistive element has a resistance value between the first contact point and the first element end, said resistance value indicative of the two-dimensional coordinates of the first contact point, said method further comprising:
connecting a reference resistance element to the first element end for said measuring, the reference resistance element having a reference resistance value; and
computing the resistance value based on the reference resistance value, the reference voltage and the first voltage value at the first element end, so as to determine the two-dimensional coordinates of the first contact point.

7. The method according to claim 5, wherein the two-dimensional coordinates of the first contact point are obtained a look-up table based on the first voltage value.

8. A touch sensing system comprising:
a touch panel according to claim 1;
the power source connected to the first substrate; and
a measurement module connected to the second substrate for obtaining the first measurement value at the first element end for determining the two-dimensional coordinates of the first contact point based on the first measurement value and obtaining the second measurement value at the second element end for determining the different two-dimensional coordinates of the second contact point.

9. The touch sensing system according to claim 8, further comprising a look-up table so that the two-dimensional coordinates of the first contact point can be determined from the look-up table based on the first measurement value.

10. An integrated display system comprising:
a touch panel according to claim 1, and
a display panel located in relationship to the touch panel, wherein the display panel comprises displayed information visible through the touch panel so as to allow a user to select the displayed information by causing the touch event on the touch panel.

11. A touch panel module comprising:
a first substrate configured for connection to a power source;

a second substrate spaced from the first substrate leaving a gap between the first substrate and the second substrate, the second substrate comprising a resistive element having a first element end and a second element end;

an electrical measurement device coupled to the first element end and the second element end, such that when a touch event occurs on the touch panel causing a contact between the first substrate and a second substrate at a first contact point and additionally at a second contact point on the resistive element, the electrical measurement device receives at least one of a first signal from the first element end and a second signal from the second element end.

12. The touch panel module according to claim 11, wherein the first signal is indicative of a length of the resistive element from the contact point to the first element end.

13. The touch panel module according to claim 11, wherein the first substrate comprises a layer of indium-tin oxide connected to the power source for providing the voltage to the resistive element in the touch event.

14. The touch panel according to claim 1, wherein the first substrate comprises a different resistive element arranged for connection to the power source for providing the voltage to the resistive element at the first contact point and at the second contact point.

15. The touch panel according to claim 1, wherein the area comprises a first sub-area and a second sub-area such that the first contact point is located in the first sub-area and the second contact point is located in the second sub-area, and wherein the resistive element comprises an element gap such that the meandering shape is divided into a first meandering part located in the first sub-area and a second meandering part located in the second sub-area, and wherein the element gap separates the resistive element into a first resistive element section having the first meandering part and the second resistive element section having the second meandering part such that the first resistive element section comprises the first element end and a third element end, and the second resistive element section comprises the second element end and a fourth element end.

16. The touch panel according to claim 15, wherein only one of the first element end and the third element end is configured for the electrical measurement for identifying the two-dimensional coordinates of the first contact point.

17. The touch panel according to claim 15, wherein when the touch event causes the contact between the first substrate and the second substrate additionally at a third contact point in the first sub-area, both the first element end and the third element end are configured for the electrical measurement for identifying the first contact point and the third contact point.

18. The touch panel according to claim 1, wherein the second substrate further comprises a different resistive element arranged in a different meandering shape in a different area, the different resistive element comprising a third element end and a fourth element end configured for electrical measurement for identifying a third contact point located in the different area caused by the contact between the first substrate and the second substrate.

19. The touch panel according to claim 1, wherein only the first element end is configured for electrical measurement to yield the first measurement value for identifying the first contact point.

20. The touch panel according to claim 1, wherein the area comprises N sub-areas and wherein the resistive element comprises (N−1) element gaps such that the meandering shape is divided into N meandering parts separately located in the N sub-areas, and wherein the (N−1) element gaps separate the resistive element into N resistive element sections, each section having a different one of the N meandering parts, and wherein each of the N resistive element sections comprises two element ends configured for electrical measurement, N being a positive integer greater than 2.

* * * * *